(12) United States Patent
Haruyama

(10) Patent No.: US 9,124,114 B2
(45) Date of Patent: Sep. 1, 2015

(54) WIRELESS POWER TRANSFER SYSTEM, POWER TRANSFER APPARATUS, AND POWER RECEPTION APPARATUS

(75) Inventor: Hideaki Haruyama, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1016 days.

(21) Appl. No.: 13/197,578

(22) Filed: Aug. 3, 2011

(65) Prior Publication Data

US 2012/0056485 A1 Mar. 8, 2012

(30) Foreign Application Priority Data

Sep. 7, 2010 (JP) .................................. 2010-199492

(51) Int. Cl.
*H01F 27/42* (2006.01)
*H02J 5/00* (2006.01)

(52) U.S. Cl.
CPC ...................................... *H02J 5/005* (2013.01)

(58) Field of Classification Search
USPC ......................................................... 307/104
See application file for complete search history.

(56) References Cited

U.S. PATENT DOCUMENTS

| 5,831,348 A | 11/1998 | Nishizawa | |
| 2005/0068019 A1* | 3/2005 | Nakamura et al. | 323/355 |
| 2008/0218314 A1* | 9/2008 | Van Eeden | 340/10.1 |
| 2009/0195295 A1* | 8/2009 | Uematsu et al. | 327/530 |
| 2010/0320962 A1* | 12/2010 | Sekita et al. | 320/108 |
| 2011/0018358 A1 | 1/2011 | Kozakai | |
| 2011/0049995 A1* | 3/2011 | Hashiguchi | 307/104 |
| 2012/0200158 A1* | 8/2012 | Takei | 307/31 |

FOREIGN PATENT DOCUMENTS

| JP | 9-326736 | 12/1997 |
| JP | 2010-051137 | 3/2010 |
| JP | 2010-068657 | 3/2010 |
| JP | 2010-141966 | 6/2010 |
| JP | 2011-030404 | 2/2011 |
| JP | 2011-0297799 | 2/2011 |

OTHER PUBLICATIONS

Japanese Patent Application No. 2010-199492, First Office Action, mailed Jan. 10, 2012, (with English Translation).

* cited by examiner

*Primary Examiner* — Jared Fureman
*Assistant Examiner* — Duc M Pham
(74) *Attorney, Agent, or Firm* — William W. Schaal; Rutan & Tucker, LLP

(57) ABSTRACT

According to one embodiment, a wireless power transfer system performs electrical power transfer and signal communication by magnetic field resonance. A power transfer apparatus includes a first resonator configured to resonate at a predetermined frequency and to switch a Q-factor between high and low, and a first controller configured to set the Q-factor of the first resonator high in the electrical power transfer, and to set the Q-factor of the first resonator low in the signal communication. The power reception apparatus includes a second resonator configured to resonate at the predetermined frequency and to switch a Q-factor between high and low, and a second controller configured to set the Q-factor of the second resonator high when performing the electrical power transfer and to set the Q-factor of the second resonator low when performing the signal communication.

17 Claims, 7 Drawing Sheets

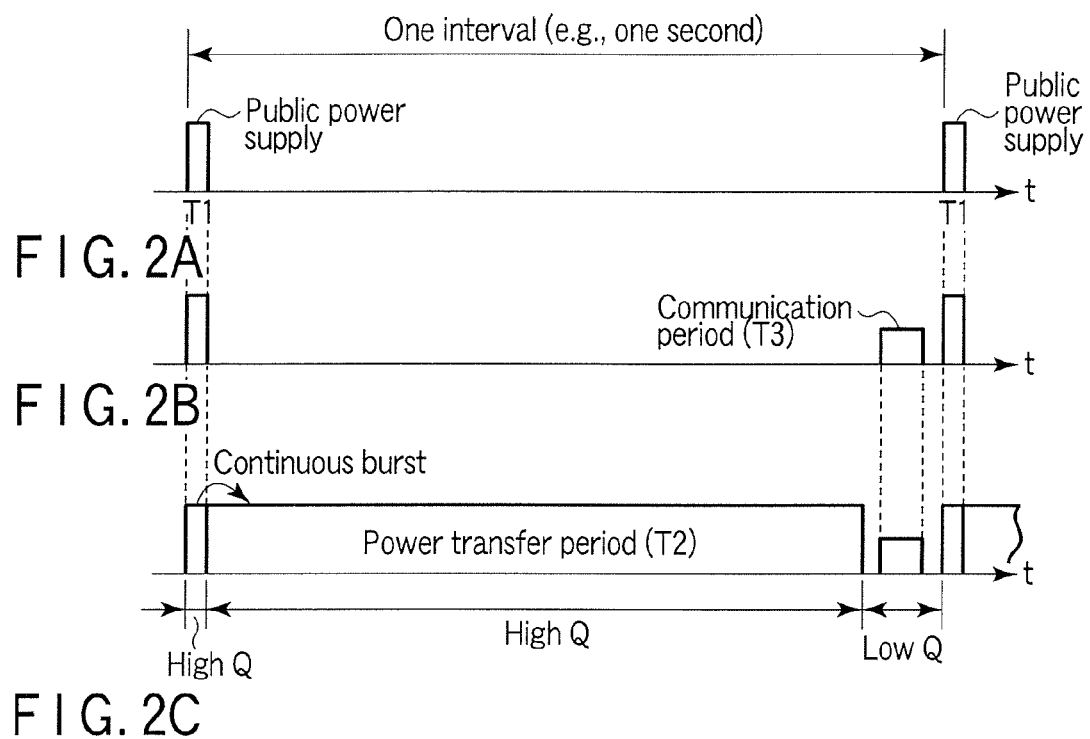
F I G. 2A
F I G. 2B
F I G. 2C
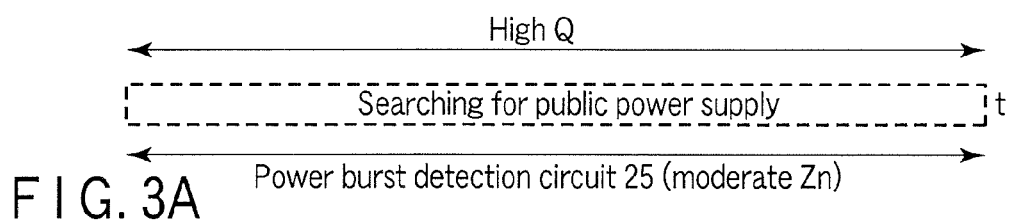
F I G. 3A
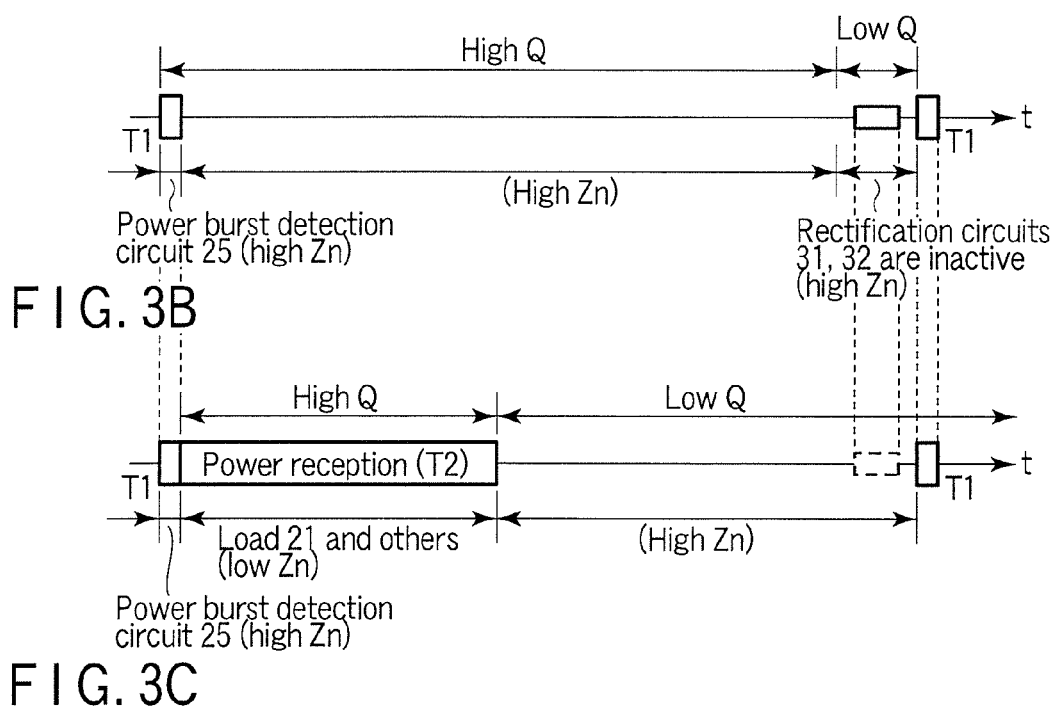
F I G. 3B
F I G. 3C

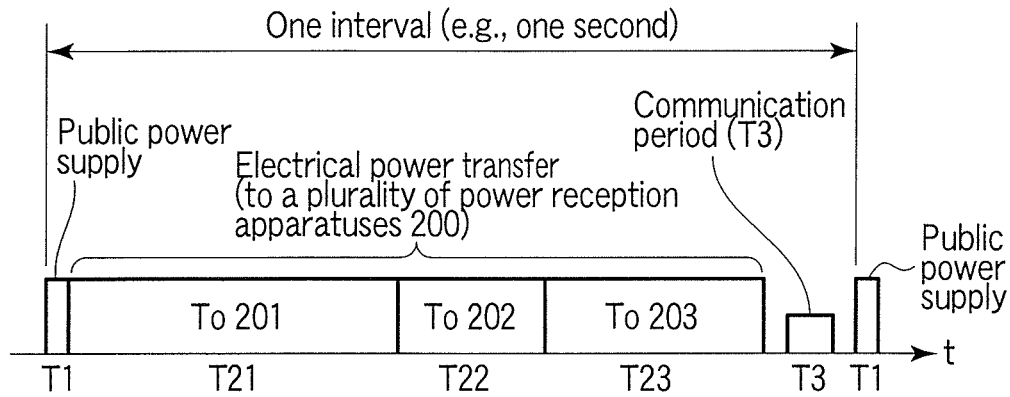
FIG. 4
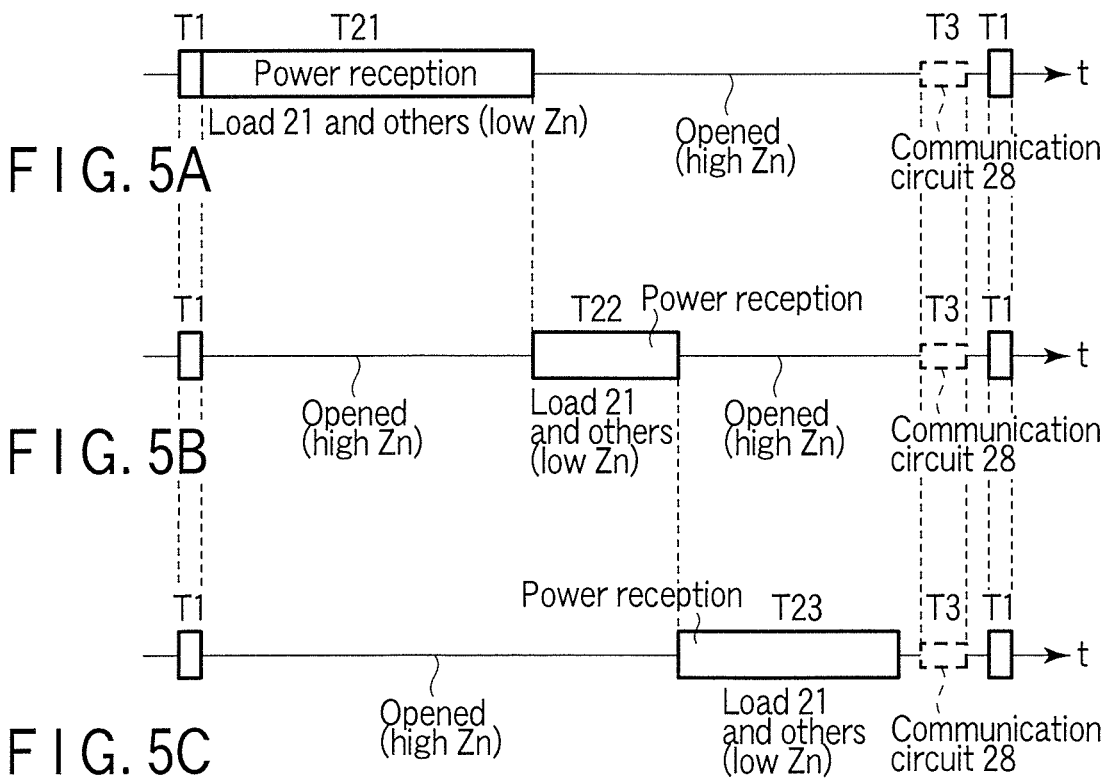
FIG. 5A
FIG. 5B
FIG. 5C

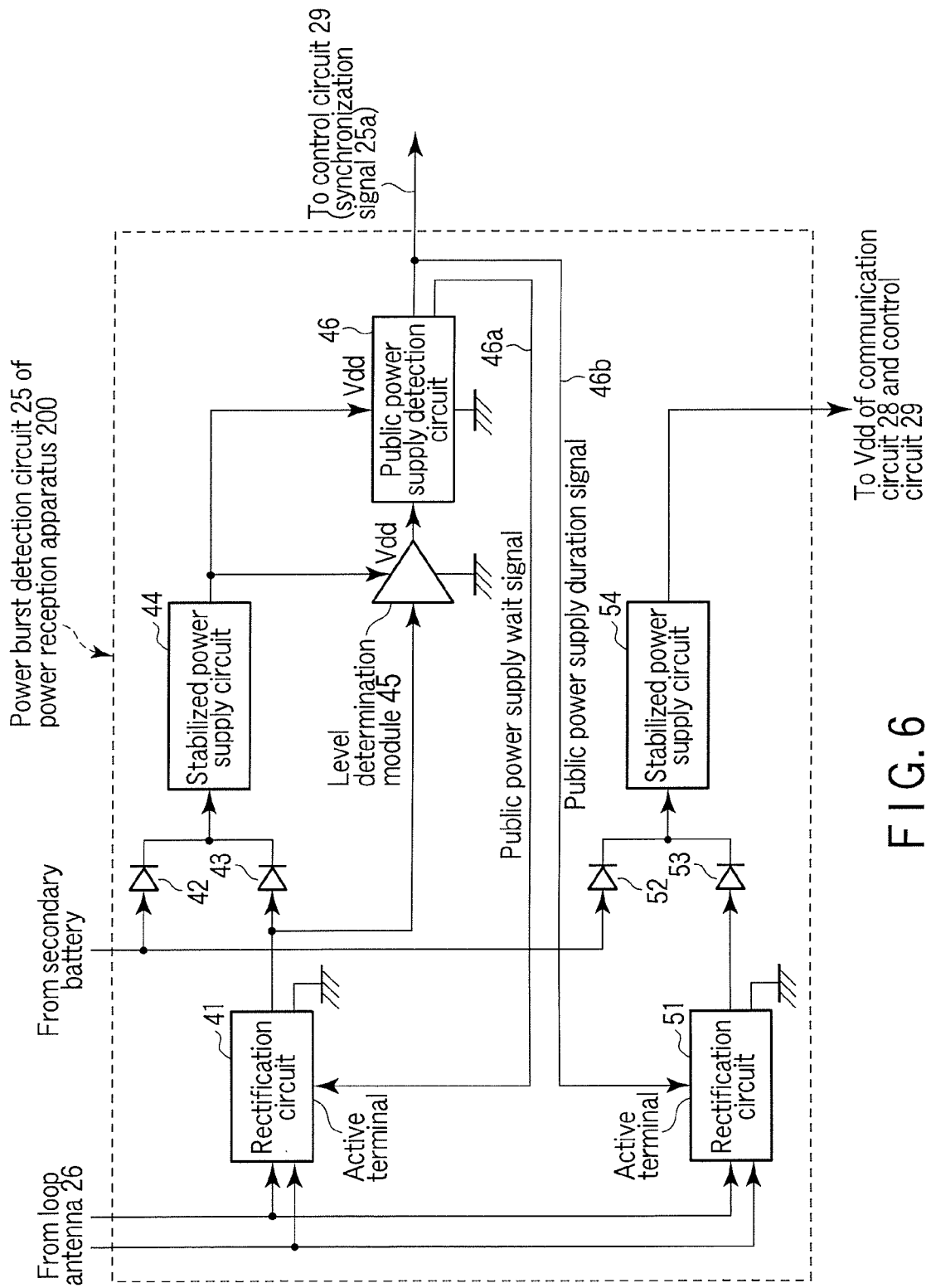
F I G. 6

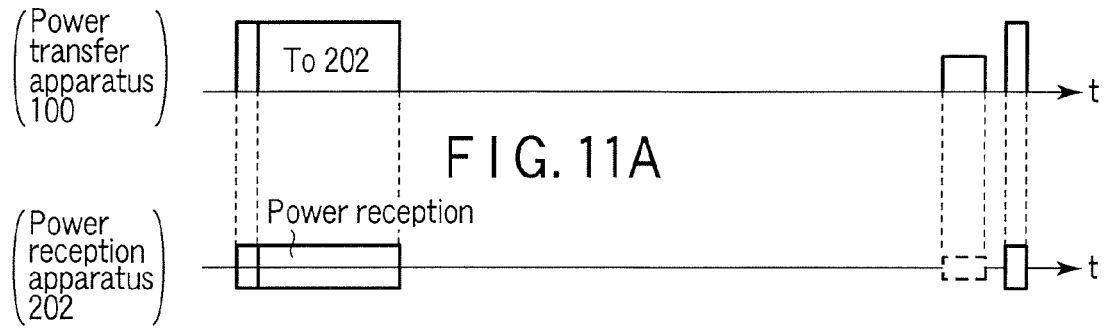
FIG. 11A
FIG. 11B
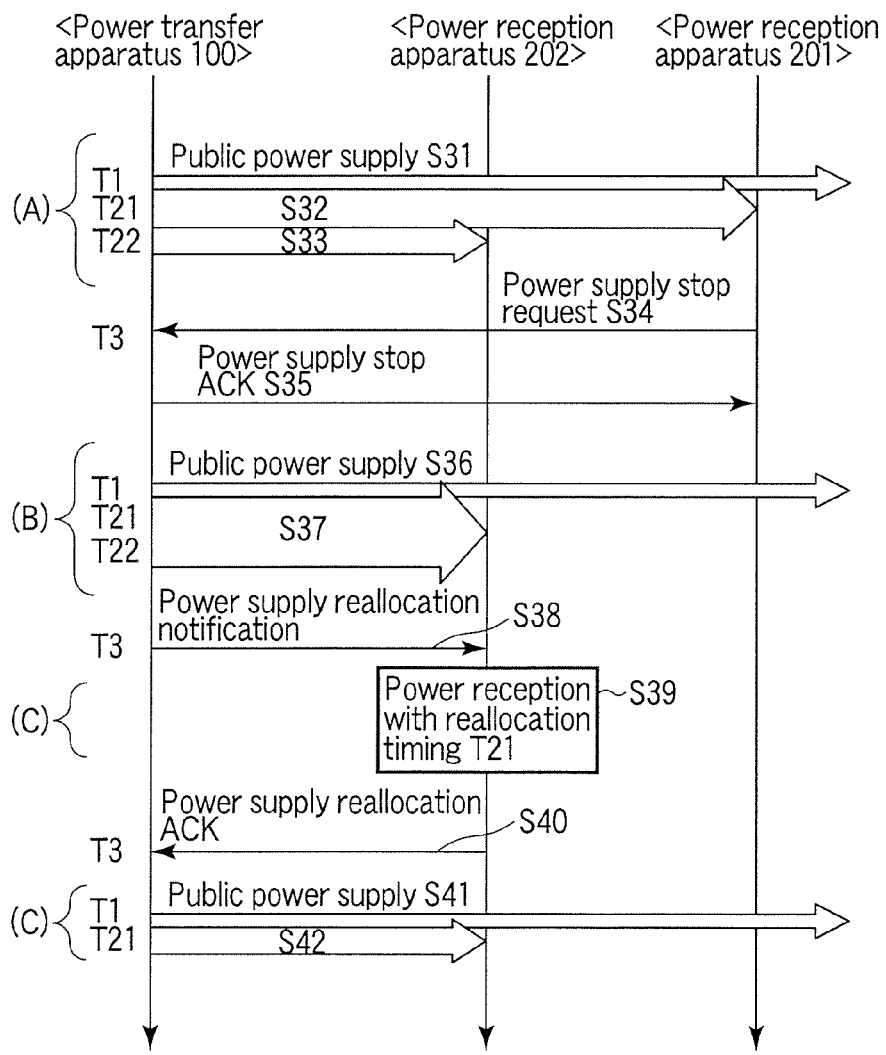
FIG. 12

WIRELESS POWER TRANSFER SYSTEM, POWER TRANSFER APPARATUS, AND POWER RECEPTION APPARATUS

CROSS-REFERENCE TO RELATED APPLICATIONS

This application is based upon and claims the benefit of priority from prior Japanese Patent Application No. 2010-199492, filed Sep. 7, 2010, the entire contents of which are incorporated herein by reference.

FIELD

Embodiments described herein relate generally to a wireless power transfer system which enables wireless power transfer and communication to coexist in a frequency band, and a power transfer apparatus and a power reception apparatus of the wireless power transfer system.

BACKGROUND

The wireless power transfer method is roughly divided into an electromagnetic induction type, a radio wave reception type, and a magnetic field resonance type.

The electromagnetic induction type of wireless power transfer method has already been put to practical use to charge a battery of an electric toothbrush or an electric shaver. This method is efficient but easily affected by misalignment between a power transfer module and a power reception module. Therefore, they are arranged so as to almost closely contact with each other. For example, they are used in such a manner that a special power reception module is fitted firmly into a special power transfer module.

The radio wave reception type of wireless power transfer method is such that electrical power is transferred in the form of electromagnetic waves and the power reception side receives the electromagnetic waves and converts them into electrical power. The radio wave reception type has been actually used in a penguin house and the like in Pittsburg Zoological Gardens. This method is free from the restriction of causing the power transfer module and the power reception module to almost closely contact with each other in the electromagnetic induction type of wireless power transfer method. However, the energy use efficiency of this method is as low as less than one percent when, for example, a dipole antenna is used at 900 MHz at a distance of two meters. Therefore, the power transfer module and power reception module have to be isolated sufficiently. In addition, what this method is actually applied to is limited to an application that features very low power consumption.

The magnetic field resonance type of wireless power transfer method was demonstrated by researchers of Massachusetts Institute of Technology in 2007 as a method for overcoming the problems of the above methods to some degree. They succeeded in supplying electrical power to a sixty-watt light bulb at a distance of two meters at an energy use efficiency of about fifty percent and turning on the bulb. In this method, each of the power transfer module and power reception module includes a resonator that resonates at a predetermined frequency, thereby causing an alternating-current magnetic field at the frequency to concentrate efficiently near the power transfer and reception modules. As a result, in the future, this method will find applications in supplying a large amount of power, such as supplying power to trams. Efficient transfer is conditional on that the Q-factor of the resonator is high.

Some sort of communication function between the power transfer module and the power reception module for authentication, declaration of power requirements, or the like is essential to put the wireless power transfer system using the aforementioned techniques to practical use.

The magnetic field resonance type of wireless power transfer method has a great amount of potential in terms of electrical power transfer distance, efficiency, transferred power amount, and the like. Therefore, the magnetic field resonance type of wireless power transfer which achieves power transfer and data communication efficiently between the power transfer module and power reception module with the minimum configuration has been desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2A, FIG. 2B, and FIG. 2C are exemplary system timing diagrams for a power transfer apparatus in the wireless power transfer system 300 according to the embodiment.

FIG. 3A, FIG. 3B, and FIG. 3C are exemplary system timing diagrams for a power reception apparatus in the wireless power transfer system 300 according to the embodiment.

FIG. 4 is an exemplary system timing diagram for the power transfer apparatus in phase φ3 in the wireless power transfer system 300 according to the embodiment;

FIG. 5A, FIG. 5B, and FIG. 5C are exemplary system timing diagrams for the power reception apparatus in phase φ3 in the wireless power transfer system 300 according to the embodiment.

FIG. 6 is an exemplary circuit diagram of a power burst detection circuit 25 of the power reception apparatus 200 according to the embodiment.

FIG. 11A and FIG. 11B are exemplary system timing diagrams for the wireless power transfer system 300 according to the embodiment (for replacement control).

FIG. 12 is an exemplary sequence diagram for the wireless power transfer system 300 according to the embodiment.

DETAILED DESCRIPTION

Various embodiments will be described hereinafter with reference to the accompanying drawings.

In general, according to one embodiment, a wireless power transfer system performs electrical power transfer and signal communication by magnetic field resonance between a power transfer apparatus and a power reception apparatus in a time-division manner. The power transfer apparatus includes a first resonator configured to resonate at a predetermined frequency and to switch a Q-factor between high and low; and a first controller configured to set the Q-factor of the first resonator high when performing the electrical power transfer, and to set the Q-factor of the first resonator low when performing the signal communication. The power reception apparatus includes a second resonator configured to resonate at the predetermined frequency and to switch a Q-factor between high and low; and a second controller configured to set the Q-factor of the second resonator high when performing the electrical power transfer and to set the Q-factor of the second resonator low when performing the signal communication.

Figure 1:
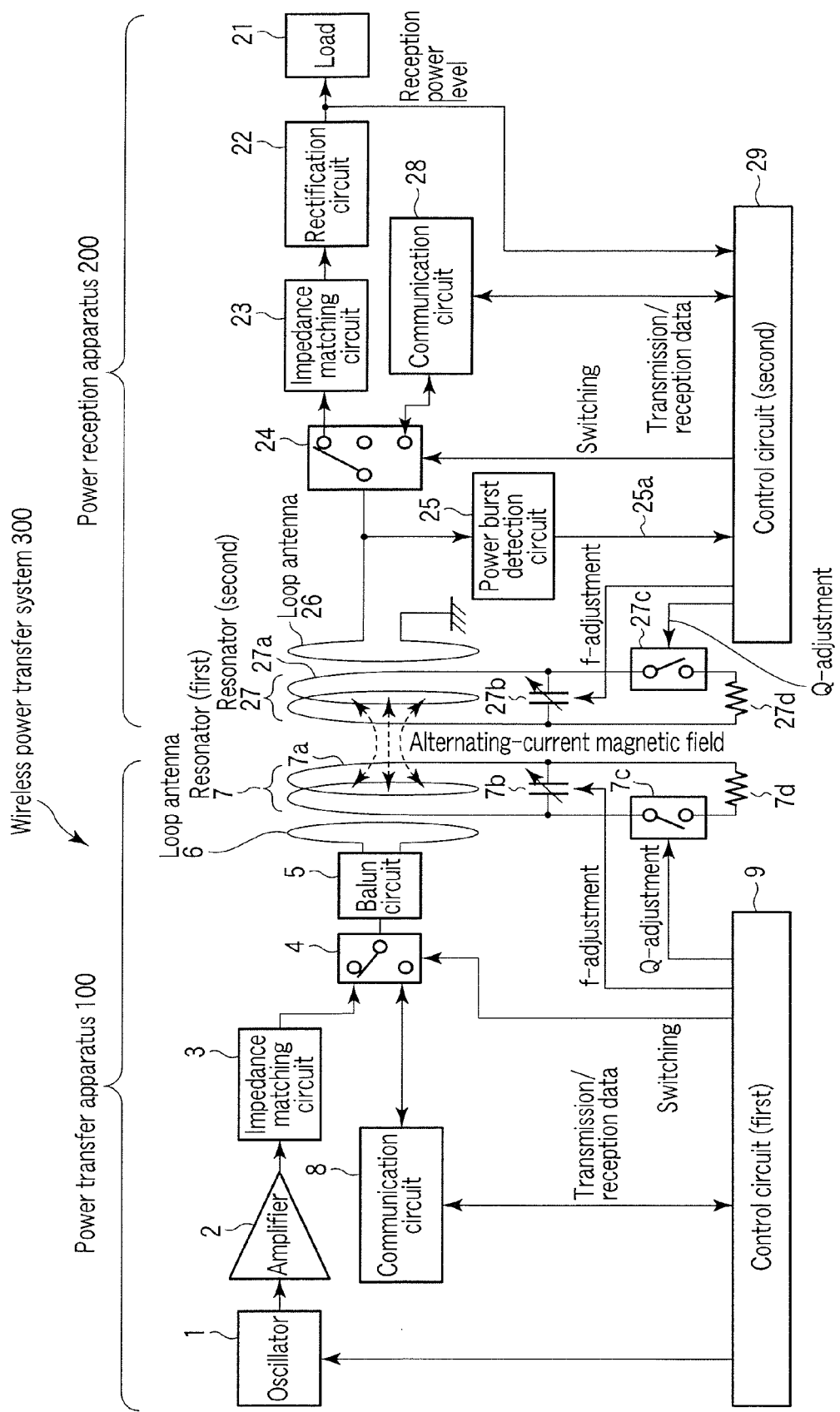
FIG. 1 is an exemplary block diagram of a wireless power transfer system 300 according to an embodiment.

FIG. 1 is a block diagram of a wireless power transfer system 300 according to an embodiment. The wireless power transfer system 300 includes a power transfer apparatus 100 and a power reception apparatus 200. A plurality of power reception apparatuses 200 may be used.

[Overview of Power Transfer and Communication]

Wireless power transfer and communication between the power transfer apparatus 100 and power reception apparatus 200 will be explained briefly. The resonant frequency of a resonator 7 (a first resonator) of the power transfer apparatus 100 and the resonant frequency of a resonator 27 (a second resonator) of the power reception apparatus 200 are adjusted so as to be equal. One resonator is driven at the resonant frequency to generate an alternating-current magnetic field. The other resonator goes into magnetic field resonance via the alternating-current magnetic field, thereby transferring electrical power and a communication signal wirelessly.

Wireless power transfer from the power transfer apparatus 100 to the power reception apparatus 200 is achieved as follows: a loop antenna 6 of the power transfer apparatus 100 is driven by power with high-frequency; the resonator 7 of the power transfer apparatus 100 and the resonator 27 of the power reception apparatus 200 go into magnetic field resonance with the generated alternating-current magnetic field, thereby directing the alternating-current magnetic field; and a loop antenna 26 of the power reception apparatus 200 receives the power. To transfer a large amount of power, the quality factor (Q-factor) of resonance of each of the two resonators is set high. For example, if resonant frequency=20 MHz and Q-factor=1000, a bandwidth at −3 dB is 20 MHz/1000=20 kHz, indicating a precipitous characteristic, that is, high-efficiency characteristic.

Wireless communication signal transmission is performed bi-directionally. One loop antenna is driven by communication signals and the other loop antenna receives its alternating-current magnetic field, thereby wirelessly transmitting the communication signals. A carrier of the communication signals has the same frequency as the resonant frequency of the resonator. The communication signals have a bandwidth since the communication signals are modulated centering on the carrier. To perform data communication at a high bit rate, the Q-factor of resonance of each of the two resonators is set low. The reason is that a high Q-factor would result in a narrow bandwidth, making high-speed data communication impossible. For example, if resonant frequency=20 MHz and Q=10 as a low Q-factor, a bandwidth at −3 dB is 20 MHz/10=2 MHz, indicating a gentle characteristic.

If the Q-factor of the resonator is low during data communication and QPSK is used as the data communication modulation scheme, data communication at about 4 Mb/s can be performed. If such a technique as high-efficiency modulation, partial response, or pre-equalization is used as the modulation scheme, a much higher bit rate may be realized.

Since the Q-factor at the time of power transfer is made different from that at the time of communication signal transmission, power transfer and communication signal transmission are performed in time division by controlling timing by causing the power transfer apparatus 100 and power reception apparatus 200 to synchronize with each other. The controlling timing is performed by causing a control circuit 9 (a first controller) of the power transfer apparatus 100 and a control circuit 29 (a second controller) to synchronize with each other.

Hereinafter, a configuration of each apparatus and its operation will be explained in detail.

[Power Transfer Apparatus 100]

The power transfer apparatus 100 includes an oscillator 1, an amplifier 2, an impedance matching circuit 3, a switch 4, a balun circuit 5 (balanced to unbalanced transformer), a loop antenna 6, a resonator 7 (a first resonator), a communication circuit 8, and a control circuit 9.

The oscillator 1, amplifier 2, impedance matching circuit 3 are dedicated parts for power transfer. The oscillator 1 outputs a high-frequency signal at a predetermined frequency. The amplifier 2 amplifies the high-frequency signal to a specific level. The impedance matching circuit 3 matches an antenna system.

The communication circuit 8 is a dedicated part for communication that modulates and demodulates data. According to a switch signal from the control circuit 9, the switch 4 switches between the oscillator 1 and others for power transfer and the communication circuit 8 for communication, thereby connecting the oscillator 1 and the communication circuit 8 to the balun circuit 5 in a time-division manner.

The balun circuit 5, loop antenna 6, and resonator 7 are used for both power transfer and communication. The balun circuit 5 performs balance-unbalance transform between the switch 4 side of the unbalanced circuit group and the balanced loop antenna 6. The balun circuit 5 may be unnecessary, depending on the configuration of the loop antenna 6.

The loop antenna 6 is electromagnetically coupled with the resonator 7. At the time of electrical power transfer, the loop antenna 6 emits high-frequency power in response to a high-frequency signal from the oscillator 1. The alternating-current magnetic field is directed by the resonator 7 and the resonator 27 of the power reception apparatus 200. The loop antenna 26 receives the energy. At the time of communication signal transmission, the loop antenna 6 emits a high-frequency signal in response to a communication signal from the communication circuit 8. At the time of communication reception, the loop antenna 6 of the power reception apparatus 200 receives a communication high-frequency signal by electromagnetic coupling and sends the high-frequency signal to the communication circuit 8. Since the Q-factor of the resonator 7 and that of the resonator 27 are both low, they do not go into a highly coupled state as when a resonator power is transferred.

The resonator 7, which is an LC resonator, includes a coil 7a that generates a magnetic field, a variable capacitor 7b, a switch 7c, and a resistor 7d. The capacitance of the variable capacitor 7b is adjusted in advance by experiment so that the resonance frequency may be, for example, at 20 MHz. Since the Q-factor varies with the resistive component, the resistance of the resistor 7d is determined by experiment in advance so that the Q-factor is high, for example, Q=1000 when the resistor 7d is disconnected by the switch 7c, and the Q-factor is low, for example, Q=10 when the switch 7c connects the resistor 7d.

The variable capacitor 6b may be made of resin whose permittivity varies with voltage. The space between both terminals of the coil 7a or the whole of the coil 7a is filled with the resin. Then, a part or all of the resin may be sandwiched with two electrodes and a voltage may be applied to the electrodes and varied, causing the capacitor capacitance to vary. With this configuration, for example, when a semiconductor element, such as a variable capacitor, has been used, or when a fixed capacitor is switched by a micro switch, such as MEMS, the semiconductor element can withstand higher electrical power.

The communication circuit 8 modulates and demodulates transmission data and reception data of the control circuit 9. The carrier frequency is set at 20 MHz, the same as the oscillating frequency of the oscillator 1. The communication circuit 8 uses any modulation method of data communication. As the communication speed is increased, the time used for power transfer can be made longer. Therefore, QPSK or other high-efficiency modulation is desirable. In addition, the bit rate per bandwidth may be increased more by using such a technique as partial response or pre-equalization.

The control circuit 9 operates the switch 4 so as to perform power transfer and communication in a time-division manner. In addition, the control circuit 9 performs f-adjustment or Q-adjustment of the resonance frequency of the resonator 7. Timing control and sequence control of the control circuit 9 will be explained later in detail (with reference to FIGS. 2A, 2B and 2C and forward).

[Power Reception Apparatus 200]

The power reception apparatus 200 includes a load 21, a rectification circuit 22, an impedance matching circuit 23, a switch 24, a power burst detection circuit 25, a loop antenna 26, a resonator 27 (a second resonator), a communication circuit 28, a control circuit 29.

The load 21, rectification circuit 22, and impedance matching circuit 23 are dedicated parts for power reception. They function as a load module when receiving electrical power (authentication power) transferred from the power transfer apparatus 100. The impedance of this load module viewed from the loop antenna 26 is low. That is, the load module is a heavy load. When viewed from the resonator 7 of the power transfer apparatus 100, the load module has a great effect on the resonator 7.

The impedance matching circuit 23 matches the antenna system. The impedance matching circuit 23 improves the power transfer efficiency by adjusting the impedance together with the impedance matching circuit 3 of the power transfer apparatus 100. The rectification circuit 22 converts the received alternating-current power into a direct current and then supplies the power to the load 21. The load 21 includes a charging circuit and a secondary battery (both not shown) and charges electricity in the secondary battery. Since the output of the rectification circuit 22 represents a power reception level, it is sent as a power reception level signal to the control circuit 29.

The communication circuit 28 is a dedicated part for communication that modulates and demodulates data. According to a switch signal from the control circuit 29, the switch 24 switches between the impedance matching circuit 23 and others for power reception and the communication circuit 28 for communication and connects them to the loop antenna 26 in a time-division manner.

The loop antenna 26 and resonator 27 are shared parts for power reception and communication signal reception. The resonator 27 is electromagnetically coupled with the loop antenna 26. At the time of power reception, the loop antenna 26 generates a high-frequency power signal from high-frequency power directed by the resonator 27 which is gone into magnetic field resonance with the resonator 7 of the power transfer apparatus 100. The power is supplied to the impedance matching circuit 23, rectification circuit 22, and load 21, thereby charging the secondary battery.

At the time of communication signal reception, the resonator 27 generates a high-frequency signal by going into magnetic field resonance with the alternating-current magnetic field from the resonator 7 of the power transfer apparatus 100. The loop antenna 26 generates a high-frequency signal for communication from the generated high-frequency signal by the resonator 27. The generated high-frequency signal for communication is sent to the communication circuit 28.

At the time of communication signal transmission, the loop antenna 26 generates a high-frequency signal for communication in response to a communication signal from the communication circuit 28. The resonator 27 then generates an alternating-current magnetic field by the generated high-frequency signal for communication. The alternating-current magnetic field is directed to the resonator 7 of the power transfer apparatus 100.

The resonator 27, which is an LC resonator, includes a coil 27a that generates a magnetic field, a variable capacitor 27b, a switch 27c, and a resistor 27d. The capacitance of the variable capacitor 27b is adjusted in advance by e.g., experiment so that the resonant frequency may be, for example, at 20 MHz, the same as the resonant frequency of the resonator 7 of the power transfer apparatus 100. Since the Q-factor varies with the resistive component, the resistance of the resistor 27d is determined by experiment in advance so that the Q-factor is high, for example, Q=1000 when the resistor 27d is disconnected by the switch 27c, and the Q-factor is low, for example, Q=10 when the switch 27c may connect the resistor 27d.

Like the variable capacitor 7b, the variable capacitor 27b may be made of resin whose permittivity varies with voltage.

The power burst detection circuit 25 stores electrical power in the power burst detection circuit 25 by detecting public power supply (authentication-free power transfer) in a predetermined period (e.g., in a one-second period) by the power transfer apparatus 100. The power burst detection circuit 25 also sends a synchronization signal 25a to the control circuit 29 by synchronizing with system timing or the predetermined period. The power burst detection circuit 25 will be explained later in detail (with reference to FIGS. 2A to 2C, FIGS. 3A to 3C).

The communication circuit 28 modulates and demodulates transmission data and reception data of the control circuit 29. The carrier frequency is set at 20 MHz, the same as the oscillating frequency of the oscillator 1. To be exact, the carrier frequency is not the same as that of the oscillator 1 since they differ in the oscillation source. Although the modulation scheme of data communication is arbitrary, QPSK or other high-efficiency modulation is desirable. In addition, the bit rate per bandwidth may be increased more by using such a technique as partial response or pre-equalization.

The control circuit 29 operates the switch 4 so as to perform power reception and communication in a time-division manner in synchronization with the synchronization signal 25a, and performs Q-adjustment of the resonance of the resonator 27. In addition, the control circuit 29 may monitor the power reception level, which is the output of the rectification circuit 22, when electrical power (authentication electrical power) transferred from the power transfer apparatus 100 is received. The control circuit 29 may adjust the variable capacitor 27b of the resonator 27 so that the power reception level may be maximized. This causes the resonant frequency of the resonator 27 to change to the optimum value. Timing control and sequence control by the control circuit 29 will be explained later in detail (with reference to FIG. 2A to FIG. 12).

Next, timing control by the control circuit 9 of the power transfer apparatus 100, the control circuit 29 of the power reception apparatus 200, and others will be explained in detail. FIGS. 2A to 2C and FIGS. 3A to 3C are system timing diagrams of the wireless power transfer system 300 (with timing in phases φ1 to φ3 respectively) according to the embodiment. FIG. 4 and FIGS. 5A to 5C are system timing diagrams of the wireless power transfer system 300 (with the timing of power transfers in phase φ3) according to the embodiment.

First, FIGS. 2A to 2C and FIGS. 3A to 3C will be explained. In the wireless power transfer system 300 of the embodiment, public power supply (authentication-free power transfer) in a period T1, power transfer (authentication power transfer) in a period T2, and communication slotting in a period T3 are performed in a time-division manner with timing previously determined by a system rule. The sequence is the transition from the phase φ1 to the phase φ2 and to the phase φ3 sequentially.

In the public power supply (authentication-free power transfer), the power transfer apparatus 100 supplies electrical power to a plurality of power reception apparatuses 200 without authentication. The supplied electrical power enables the minimum part of the power reception apparatus 200 to operate.

In the power transfer (authentication power transfer), the power transfer apparatus 100 supplies electrical power to a power reception apparatus 200 which is authenticated by the power transfer apparatus 100. The supplied power is the original large amount of power.

As shown in FIG. 2A, in the phase φ1, public power supply (period T1) is performed in a predetermined interval, for example, in a one-second interval. The public power supply is also used as a synchronization signal for the system timing. In the public power supply, power is supplied to a plurality of power reception apparatuses 200 publicly without authentication. The supplied electrical power enables the minimum part of power reception apparatuses 200 to operate for e.g., the synchronous processing. The public power supply is performed continuously. The interval of the public power supply is also used as the basic timing in the subsequent phases φ2 and φ3.

As shown in FIG. 2B, in the phase φ2, the power transfer apparatus 100 exchanges authentication, information indicative of an amount of required power, and others by communication (in the period T3) with the power reception apparatus 200. The power transfer apparatus 100 and the power reception apparatus 200 are synchronized with the timing of the public power supply. As shown in FIG. 2C, in the phase φ3, the public power supply (in the period T1), the original power transfer (in the period T2), and the communication (in the period T3) are performed in a time-division manner. The power transfer period (period T2) is further divided in time when there is a plurality of power reception apparatuses 200.

The power transfer apparatus 100 sets the Q-factor of the resonator 7 high to transfer electrical power at high efficiency in the public power supply period and power transfer period. The power transfer apparatus 100 sets the Q-factor of the resonator 7 low to acquire a bandwidth for communication in the communication period. Similarly, the power reception apparatus 200 controls the Q-factor of the resonator 27 in synchronization with the timing after having synchronized with the timing of the public power supply.

Hereinafter, the transition from the phase φ1 to the phase φ2, and to the phase φ3 in sequence will be explained in detail.

[Phase φ1]

In the phase φ1, the power transfer apparatus 100 sets a high Q-factor for the resonator 7 and continues the public power supply at a predetermined interval, for example, at a one-second interval. Specifically, the control circuit 9 (FIG. 1) raises the Q-factor of the resonator 7 by opening the switch 7c to disconnect the resistor 7d. In addition, the control circuit 9 sets the switch 4 to the impedance matching circuit 3 side. Then, the control circuit 9 causes the oscillator 1 to output an oscillation signal in a period T1 and repeat the output at a predetermined interval (e.g., at a one-second interval). As a result, the resonator 7 transfers public electric power in the form of an alternating-current magnetic field.

As shown in FIG. 3A, in the phase φ1, the power reception apparatus 200 searches for, that is, detects public power supply. While searching for the public power supply, the power reception apparatus 200 always sets the Q-factor for the resonator 27 high. Therefore, the power reception apparatus 200 stays in a state where the power reception apparatus 200 efficiently receives electrical power of the public power supply. However, when the power reception apparatus 200 is outside the range of the alternating-current magnetic field of the power transfer apparatus 100, the power reception apparatus 200 cannot detect the public power supply even if searching for it. When the power reception apparatus 200 is placed within the range of the alternating-current magnetic field of the power transfer apparatus 100, electrical power is charged in the power burst detection circuit 25 by the public power supply. After power that enables the power burst detection circuit 25 to operate has been charged, the power reception apparatus 200 detects a period T1 of the public power supply and synchronizes with the period T1. The control circuit 29 (FIG. 1) raises the Q-factor of the resonator 27 by opening the switch 27c to disconnect the resistor 27d.

In the phase φ1, the power reception apparatus 200 always makes the Q-factor of the resonator 27 high to search for the public power supply, staying in a state where the power reception apparatus 200 efficiently receives electrical power of public power supply. The power burst detection circuit 25 detects public power supply, synchronizes with the timing of the public power supply, and stores the timing in a counter (not shown) or the like. When having detected the public power supply and synchronized with the timing of the public power supply, the power reception apparatus 200 makes the transition to the phase φ2.

[Phase φ2]

In the phase φ2, authentication and others between the power transfer apparatus 100 and the power reception apparatus 200 are performed through communication in a communication period T3. The control circuit 9 of the power transfer apparatus 100 makes low the Q-factor of the resonator 7 in the communication period. Since the power reception apparatus 200 has synchronized with the timing of the public power supply and the communication period T3 has been determined, the power reception apparatus 200 makes low the Q-factor of the resonator 27 only in the period T3 as shown in FIG. 3B. The communication period T3 is a period from when power burst has finished until the following public power supply T1 starts. The duration of power burst cannot be predicted by the power reception apparatus 200. However, the timing of the following public power supply can be predicted by using their periodicity. Therefore, the collision between the electrical power supply and the communication can be avoided. The power reception apparatus 200 exchanges authentication, information indicative of an amount of required power, detailed timings of power transfer, and others with the power transfer apparatus 100 and then goes into the phase φ3.

[Phase φ3]

In the phase φ3, the public power supply, power transfer, and communication are performed as shown in FIGS. 2C and 3C. The communication is performed as needed when, for example, completion of charging is notified after the power reception apparatus 200 has received the public power supply and finished being charged.

Next, FIG. 4 and FIGS. 5A to 5C will be explained. In the wireless power transfer system 300, a power transfer apparatus 100 can transfer electrical power to a plurality of power reception apparatuses 200. FIG. 4 and FIGS. 5A to 5C are diagrams to explain the time division of power transfer to the plurality of power reception apparatuses 200 (201, 202, 203) in the phase φ3.

As shown in FIG. 4, the power transfer apparatus 100 allocates power transfer periods in a time division manner in the order in which the power reception apparatuses 200 have been connected, specifically in the order of 201, 202, 203 in this example. In addition, as shown in FIGS. 5A to 5C, periods T21, T22, T23 are determined so that a public power supply period T1 and a plurality of power transfer periods T21, T22, T23 may burst continuously without a break. The length of each of periods T21, T22, T23 is determined according to the power required by each power reception apparatus 200.

The power reception apparatus 203 detects a continuous burst state of the periods T1, T21, and T22 when the power reception apparatus 203 tries to connect to the power transfer apparatus 100 while the power transfer apparatus 100 is transferring power to the power reception apparatuses 201 and 202. The power reception apparatus 203 accurately acquires the start timing of the period T1 for the public power supply by detecting a rising edge of the period T1. Therefore, the power reception apparatus 203 synchronizes with the period T1.

An impedance Zn of each of the power reception apparatuses 201, 202, 203 is set low in the power reception period. Since the impedance Zn is made high in a period other than the power reception period, the effect on the power transfer apparatus 100 in time-division power transfer to the power reception apparatuses 200 is reduced.

[Impedance Zn in FIGS. 2A to FIG. 5C]

An impedance Zn in the power reception apparatus 200 viewed from the loop antenna 26 will be explained. First, a load on the switch 24 side will be explained. In the power reception period T2 in the phase φ3, the impedance Zn becomes low because the loop antenna 26 is connected to the heavy load 21 via the switch 24.

In a period other than the power reception period T2, the switch 24 is opened or the loop antenna 26 is connected to the communication circuit 28 via the switch 24. When the switch 24 is opened, the impedance Zn is high. When the loop antenna 26 is connected to the communication circuit 28 in the period T3, the impedance Zn is equal to the impedance of the communication circuit 28.

That is, when receiving no electrical power, the power reception apparatus 200 raises its own impedance. Only any one of the power reception apparatuses 200 has a low impedance Zn, which is viewed from the power transfer apparatus 100, during the power transfer period excluding the public power supply period. Therefore, the effect on the power transfer apparatus 100 and the remaining power reception apparatuses 200 can be alleviated.

The power burst detection circuit 25 is also connected to the loop antenna 26. The impedance of the power burst detection circuit 25 will be explained together with the operation of the power burst detection circuit 25 below with reference to FIG. 6.

FIG. 6 is a circuit diagram of the power burst detection circuit 25 of the power reception apparatus 200 according to the embodiment. The principal functions of the power burst detection circuit 25 are: to charge power of public power supply in a period T1 at a predetermined interval (e.g., at a one-second interval) transferred from the power transfer apparatus 100 so as to enable the power burst detection circuit 25 itself to operate; to synchronize with system timing by detecting the period T1 of the public power supply after the power burst detection circuit 25 can operate; and to raise the impedance of the power burst detection circuit 25 itself viewed from the loop antenna 26 with the timing unnecessary for power reception to alleviate the effect on the power transfer apparatus 100.

The power burst detection circuit 25 includes a rectification circuit 41, diodes 42, 43, a stabilized power supply circuit 44, a level determination module 45, a public power supply detection circuit 46, a rectification circuit 51, diodes 52, 53, and a stabilized power supply circuit 54.

[System of Rectification Circuit 41]

The rectification circuit 41 converts an alternating-current output of the loop antenna 26 into a direct current. The output of the rectification circuit 41 and that of the secondary battery (not shown) are supplied via diodes 42, 43 to the stabilized power supply circuit 44. The stabilized power supply circuit 44 uses the power supply whose voltage is higher than that of the other.

The rectification circuit 41 includes a switch (not shown) that connects between the rectification circuit 41 and the loop antenna 26 or disconnects between the rectification circuit 41 and the loop antenna 26. When an active terminal is on, the loop antenna 26 and rectification circuit 41 are connected. When the active terminal is off, the rectification circuit 41 is disconnected from the loop antenna 26, with the result that the impedance of the rectification circuit 41 becomes higher which is viewed from the loop antenna 26.

The stabilized power supply circuit 44 supplies electricity Vdd to the level determination module 45 and the public power supply detection circuit 46. When having no sufficient electrical power to drive the level determination module 45 and public power supply detection circuit 46, the stabilized power supply circuit 44 does not supply electrical power to them until it has charged sufficient electrical power.

[System of Rectification Circuit 51]

The rectification circuit 51 converts an alternating-current output of the loop antenna 26 into a direct current. The output of the rectification circuit 51 and that of the secondary battery (not shown) are supplied via the diodes 52, 53 to the stabilized power supply circuit 54. The stabilized power supply circuit 54 uses the power supply whose voltage is higher than that of the other.

The rectification circuit 51 includes a switch (not shown) that connects between the rectification circuit 51 and the loop antenna 26 or disconnects between the rectification circuit 51 and the loop antenna 26. When an active terminal is on, the loop antenna 26 and rectification circuit 51 are connected. When the active terminal is off, the rectification circuit 51 is disconnected from the loop antenna 26, with the result that the impedance of the rectification circuit 51 becomes higher which is viewed from the loop antenna 26.

The stabilized power supply circuit 54 supplies electricity Vdd to the communication circuit 28 and the control circuit 29. When having no sufficient electrical power to drive the communication circuit 28 and control circuit 29, the stabilized power supply circuit 54 does not supply electrical power to them until it has charged sufficient electrical power.

[Synchronization and Impedance Control]

The level determination module 45 determines the level of a direct-current signal from the rectification circuit 41. The rectification circuit 41 converts alternating current in the public power supply, power transfer, and communication of FIGS. 2A to 2C, FIGS. 3A to 3C, FIG. 4, and FIGS. 5A to 5C into direct currents and produces envelope signals of these signals. The level of the envelope signal of each of the public power supply and power transfer is high because the Q-factors of the resonator 7 and resonator 27 are high. The level of the envelope signal is low because its Q-factor is low in communication. If the level determination threshold value of the level determination module 45 is set to a value intermediate between the high level and the low level, the envelope signals of only the public power supply and power transfer are detected.

The level determination module 45 detects, only a timing signal for the public power supply period T1 in the phase $\phi1$ of FIGS. 2A to 2C and FIGS. 3A to 3C. As in the phase $\phi1$, in the phase $\phi2$, the level determination module 45 detects only a timing signal for the public power supply period T1 because the level in the communication period T3 is low and not greater than the threshold value. In the phase $\phi3$, the level determination module 45 detects a timing signal for the public power supply period T1 and the power transfer period T2 following to the public power supply period T1.

The public power supply detection circuit 46 detects the rising of the output of the level of the level determination module 45. Then, the public power supply detection circuit 46 checks whether the period of rising timing coincides with one period of the system timing (e.g., one second). If they coincide with each other, the public power supply detection circuit 46 regards the detected timing as the public power supply period T1 and then stores the timing as the system timing in an internal counter (not shown).

Generally, the difference between the electrical power for communication and the electrical power for power transfer is not less than 30 dB. Therefore, the level determination module 45 can make a suitable adjustment to avoid detecting a communication signal as a public power supply burst erroneously. In addition, even if the level of a communication envelope signal is high and the level determination module 45 outputs the high-level signal, the public power supply detection circuit 46 can detect the rising of public power supply accurately by checking the period of the rising timing.

Furthermore, the public power supply detection circuit 46 makes the rectification circuit 41 active by outputting a public power supply wait signal 46a. The period during which the public power supply detection circuit 46 makes the rectification circuit active is: the period during which electrical power is not supplied to the public power supply detection circuit 46; a long period during which the public power supply is being searched for (in the phase $\phi1$ of the power reception apparatus 200 of FIG. 3A); a short period of the public power supply after synchronization (in the phase $\phi2$ in the power reception apparatus 200 of FIG. 3B); or a short period of the public power supply in the phase of electrical power reception (in the phase $\phi3$ of the power reception apparatus 200 of FIG. 3C). In these periods, the public power supply detection circuit 46 makes the rectification circuit 41 active and continues waiting for the public power supply.

During the long period in the phase $\phi1$, the rectification circuit 41 is active, causing the stabilized power supply 44, level determination module 45, public power supply detection circuit 45, and others to become a load. This load is a moderate impedance as compared with the load 21, that is, the moderate impedance Zn shown in the phase $\phi1$ of the power reception apparatus 200 of FIG. 3A.

The public power supply detection circuit 46 further makes the rectification circuit 51 active by outputting a public power supply duration signal 46b. The period during which the public power supply detection circuit 46 makes the public power supply duration signal 46b active is a short period of the public power supply after synchronization (the phase $\phi2$ of the power reception apparatus 200 of FIG. 3B), or a short period of the public power supply in the phase of electrical power reception (in the phase $\phi3$ of the power reception apparatus 200 of FIG. 3C). The public power supply duration signal 46b is sent as a synchronization signal 25a to the control circuit 29.

The public power supply detection circuit 46 makes the rectification circuit 51 active according to the public power supply duration signal 46b only during a short duration for the public power supply and continues waiting for the public power supply. Accordingly, the load on the rectification circuit 51 side becomes a relatively high impedance Zn.

As described above, the rectification circuits 41, 51 are made active only when necessary and are made inactive (high impedance Zn) when unnecessary, thereby alleviating the effect on the power transfer apparatus 100.

Figure 7:
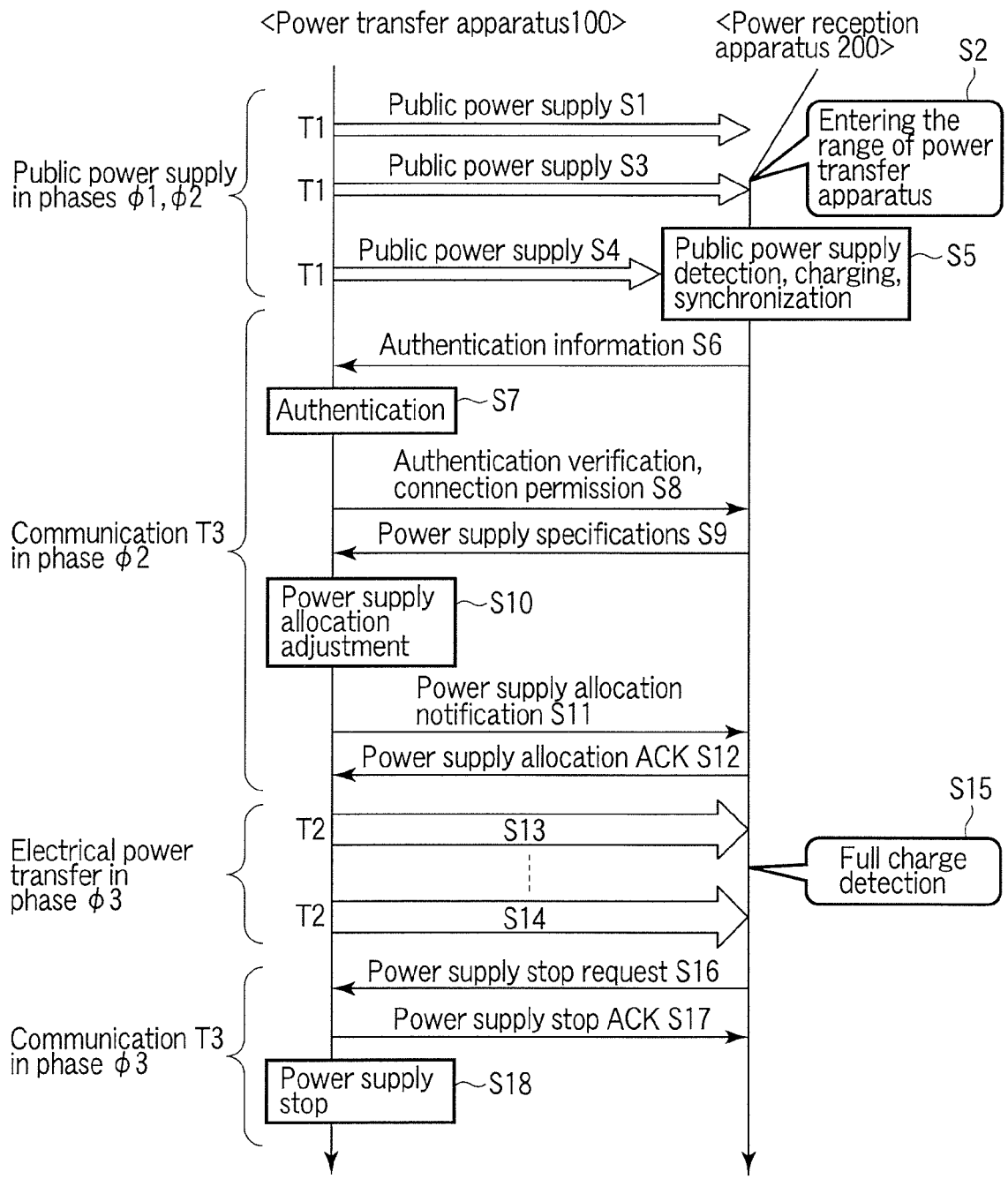
FIG. 7 is an exemplary sequence diagram of the wireless power transfer system 300 according to the embodiment.

Next, sequence control to perform the transition from the phase $\phi1$ to the phase $\phi2$ and to the phase $\phi3$ will be explained. FIG. 7 is a sequence diagram of the wireless power transfer system 300 according to the embodiment. The exchange between the power transfer apparatus 100 and the power reception apparatus 200 will be explained. The control circuit 9 controls mostly the power transfer apparatus 100. The control circuit 29 controls mostly the power reception apparatus 200.

[Synchronization in Phases $\phi1$ and $\phi2$]

In the phases $\phi1$ and $\phi2$, the power transfer apparatus 100 performs the public power supply in a period T1 (S1, S3, S4) at a predetermined interval (e.g., a one-second interval).

The power reception apparatus 200 searches for the public power supply. When the power reception apparatus 200 is outside the range of the alternating-current magnetic field of the power transfer apparatus 100, the power reception apparatus 200 cannot detect the public power supply even if searching for the public power supply. When the power reception apparatus 200 is placed within the range of the alternating-current magnetic field of the power transfer apparatus 100 (S2), the power reception apparatus 200 charges electrical power through the public power supply (S3, S4). If the power burst detection circuit 25 can operate, the power reception apparatus 200 detects the public power supply and synchronizes with the timing of the public power supply.

[Communication in Phase $\phi2$]

Next, the power reception apparatus 200 sends authentication information at the time of communication T3 (S6). The power transfer apparatus 100 performs authentication (S7) and sends authentication verification and connection permission to the power reception apparatus 200 (S8). The power reception apparatus 200 sends power supply specifications, including e.g., an amount of electrical power required for itself, to the power transfer apparatus 100 (S9).

The power transfer apparatus 100 determines the duration of power burst according to the power supply specifications. The power transfer apparatus 100 makes adjustments so as to determine what time in power transfer period T2 (the starting point and the ending point) power supply is allocated to the power reception apparatus 200 (S10). The power transfer apparatus 100 then sends power supply allocation notice to the power reception apparatus 200 (S11). The power reception apparatus 200 sends power supply allocation ACK to the power transfer apparatus 100 (S12).

In the simplest implementation, its own ID sufficient to discriminate the power reception apparatus 200 from another may be used as authentication information. To achieve higher authentication, not only ID but also manufacturer information, device type, certificate data from a certification organization and others may be included in the authentication information. The information may be used to set priorities to a plurality of power reception apparatuses when the power supply capability of the power transfer apparatus is insufficient to supply electrical power to the power reception apparatuses.

[Power Transfer in Phase φ3]

The power transfer apparatus 100 transfers electricity to the power reception apparatus 200 at an allocated time in the power transfer period T3 (S13). The power transfer apparatus 100 repeats the transfer (S14). The power reception apparatus 200 charges, for example, the secondary battery by the received electrical power and detects full charge (S15).

Then, the power reception apparatus 200 sends a power supply stop request to the power transfer apparatus 100 in the communication period T3 in the phase φ3 (S16). The power transfer apparatus 100 sends a power supply stop ACK to the power reception apparatus 200 (S17). The power transfer apparatus 100 stops the power supply to the power reception apparatus 200 (S18).

In addition, in the communication period T3 of the phase φ3, the power transfer apparatus 100 checks the existence of the power reception apparatus 200 by periodically polling the power reception apparatus 200 to which electricity is being transferred. If there is no response from the power reception apparatus 200 for a predetermined period or a predetermined number of times, the power transfer apparatus 100 determines that the power reception apparatus 200 has been removed from the power transfer area and then stops transferring electricity to the power reception apparatus 200.

The communication period T3 is shared by the plurality of power reception apparatuses 200. Therefore, it is desirable that a multi-access protocol, such as a CSMA, should be implemented as a MAC layer to prevent communications from competing against one another.

Since a series of communications need not be completed in the communication period (slot) T3, and the series of communications may extend over a plurality of communication slots.

The electrical power transfer has been performed in the phase φ3. The power reception apparatus 200 may be a power reception apparatus used in the home, for example, a low-power-consumption, small-size, inexpensive power reception apparatus required to be mounted on e.g., a remote controller or glasses for a 3D-TV. Such power reception apparatuses may be charged by only the public power supply without authentication. The most inexpensive power reception apparatus 200 may include a module that detects the rising of power burst and a module that receives electrical power in the public power supply period.

The power reception apparatus 200 may provide authentication information at that time. This enables the power transfer apparatus to monitor what power reception apparatus is in its transfer area. The power transfer apparatus may have the function of displaying a list of power reception apparatuses existing in the transfer area on the display module based on the authentication information. The display module may define a specific management information base (MIB) on the assumption that the power transfer apparatus is connected to a network in the home and offer the MIB to another PC or the like using a management protocol such as SNMP. For example, if SNMP and a dedicated software program have been installed in a TV or a PC, it is determined easily which power reception apparatus exists near which the power transfer apparatus in the home.

Furthermore, in the phase φ3, the control circuit 29 of the power reception apparatus 200 may monitor the output level of the rectification circuit 22 in the power reception period T2 and adjust the variable capacitor 27b of the resonator 27 so that the output level may be maximized. This causes the resonant frequency of the resonator 27 to change to the optimum value.

FIGS. 8A to 8C, FIGS. 9A to 9C, FIGS. 10A and 10B, and FIGS. 11A and 11B are system timing diagrams for the wireless power transfer system 300 according to the embodiment (for replacement control). FIG. 12 is a sequence diagram of the wireless power transfer system according to the embodiment (for replacement control). These diagrams relate to continuous burst replacement control when one of the power reception apparatuses 200 to which electricity is being transferred in the phase φ3 has finished receiving electrical power.

FIGS. 8A to 8C, FIGS. 9A to 9C, FIGS. 10A and 10B, and FIGS. 11A and 11B correspond to (A), (B), (C), and (D) of FIG. 12, respectively. An explanation will be given with reference to these diagrams.

Figure 8A:
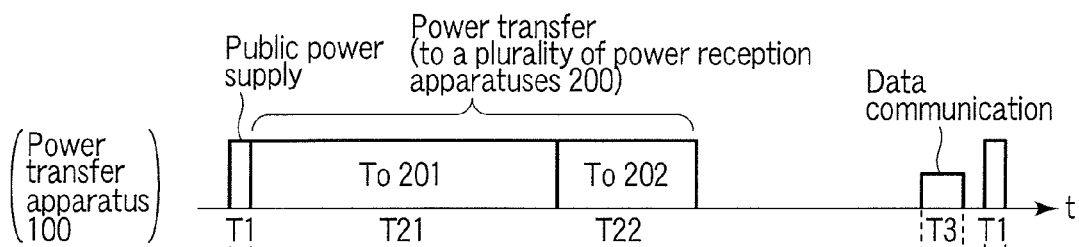
FIG. 8A, FIG. 8B, and FIG. 8C are exemplary system timing diagrams for the wireless power transfer system 300 according to the embodiment (for replacement control).
Figure 8B:
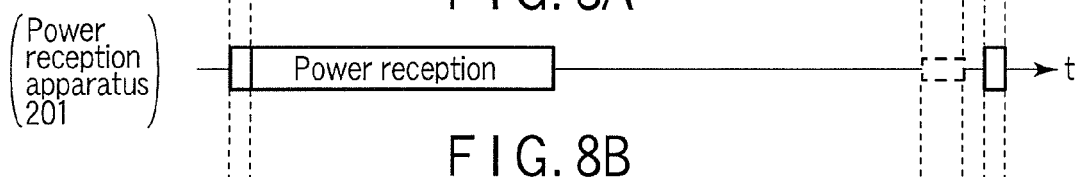
Figure 8C:
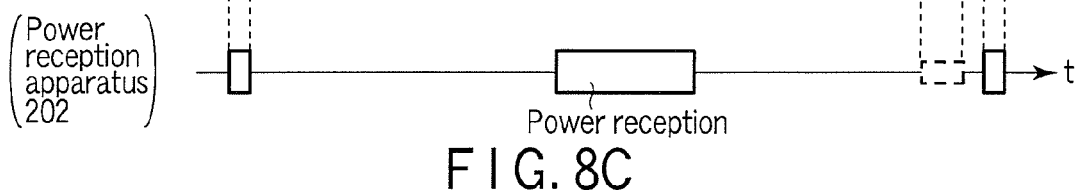
Figure 9A:
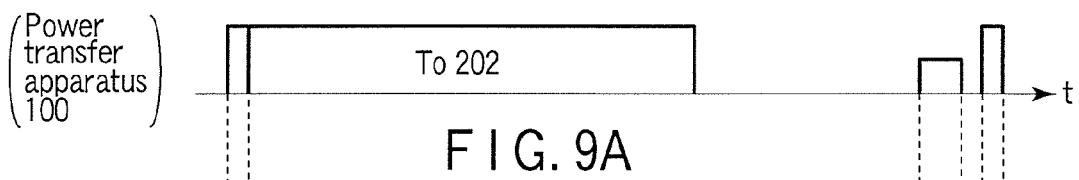
FIG. 9A, FIG. 9B, and FIG. 9C are exemplary system timing diagrams for the wireless power transfer system 300 according to the embodiment (for replacement control).
Figure 9B:
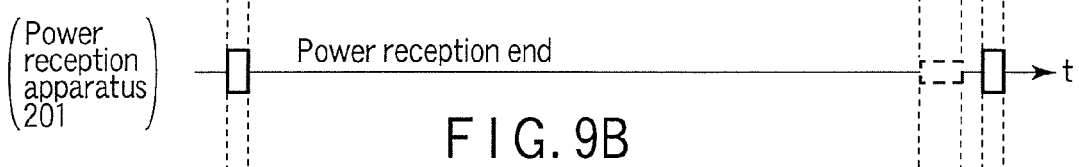
Figure 9C:
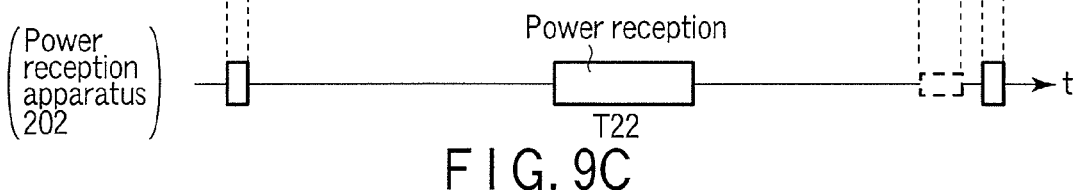
Figure 10A:
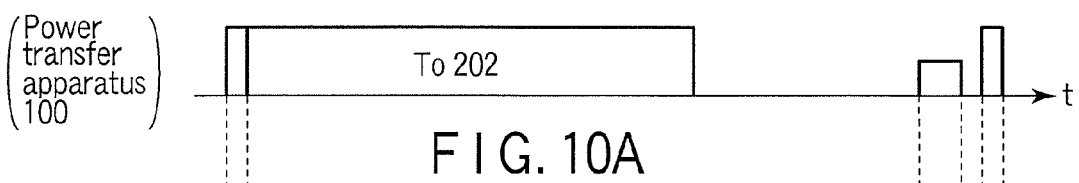
FIG. 10A and FIG. 10B are exemplary system timing diagrams for the wireless power transfer system 300 according to the embodiment (for replacement control).
Figure 10B:
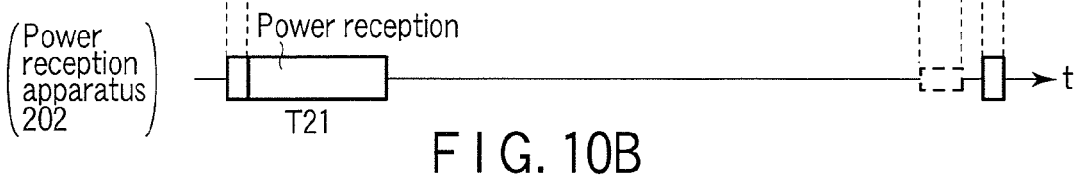

In (A) of FIG. 12, the power transfer apparatus 100 performs public power supply in a period T1 (S31), successively transfers electricity to the power reception apparatus 201 in a period T21 (S32), and further successively transfers electricity to the power reception apparatus 202 in a period T22 (S33). As a result, the public power supply and the plurality of power transfers produce continuous burst as shown in FIGS. 8A to 8C. The power reception apparatuses 201 and 202 receive electricity in the allocated periods T21 and T22, respectively.

After having received the electricity, the power reception apparatus 201 sends a power supply stop request in a period T3 (S34). The power transfer apparatus 100 returns a power supply stop ACK (S35).

In (B) of FIG. 12, the power transfer apparatus 100 sends a power supply reallocation notice to the power reception apparatus 202 in the period T3, while continuing the power transfer in the periods T21 and T22 (S38). The power supply reallocation notice is an instruction to move up the power reception timing of the power reception apparatus 202 toward T21. This process corresponds to FIGS. 9A to 9C.

In (C) of FIG. 12, the power reception apparatus 202 receives electricity by moving the power reception timing to T21 (S39). Then, the power reception apparatus 202 returns a power supply reallocation ACK (S40). This process corresponds to FIGS. 10A and 10B.

In (D) of FIG. 12, the power transfer apparatus 100 transfers electricity only in the period T21 (S42) and the power reception apparatus 202 receives electricity in this period. This process corresponds to FIGS. 11A and 11B.

As described above, following the public power supply, all electrical power transfers are performed in continuous burst form, which enables public power supply to be detected easily by detecting the rising of a continuous burst when a new power reception apparatus 200 begins to receive electricity.

In FIGS. 8A to 8C, FIGS. 9A to 9C, FIGS. 10A and 10B, FIGS. 11A and 11B, and FIG. 12, since the power reception apparatus 201 in the period T21 at the beginning part of a continuous burst stopped receiving electricity earlier, the continuous burst broke off. If the power reception apparatus 202 in the period T22 at the trailing part of the continuous burst stopped receiving electricity earlier, the continuous burst would not break off. Therefore, the power reception apparatus 201 need not replace the power reception period T21 and only the power transfer apparatus 100 sets the transfer period to T21.

According to the embodiment, electrical power transfer by magnetic field resonance at a resonator and communication by magnetic field resonance at the resonator can be performed in a time-division manner. In addition, the power reception apparatus performs control so as to raise its own impedance in the period unnecessary for power reception, thereby alleviating the effect on the power transfer apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless power transfer system configured to perform electrical power transfer and signal communication by magnetic field resonance between a power transfer apparatus and a power reception apparatus in a time-division manner,
    wherein electrical power comprises first electrical power and second electrical power,
    the power transfer apparatus comprises:
        a first resonator to resonate at a predetermined frequency and to switch a Q-factor between high and low; and
        a first controller to set the Q-factor of the first resonator high when performing the electrical power transfer, to set the Q-factor of the first resonator low when performing the signal communication, to transfer the first electrical power at a predetermined interval, to perform authentication based on authentication information comprising identification information of the power reception apparatus from the power reception apparatus, and to transfer the second electrical power to a power reception apparatus which is authenticated and whose allocated period has checked by the signal communication, and
    wherein the power reception apparatus comprises:
        a second resonator to resonate at the predetermined frequency and to switch a Q-factor between high and low; and
        a second controller to set the Q-factor of the second resonator high when performing the electrical power transfer, to set the Q-factor of the second resonator low when performing the signal communication, to receive the first electrical power without authentication, to perform synchronization with the power transmitting apparatus based on the predetermined interval of the first electrical power, and to receive the second electrical power reception after authentication and check of an allocated period by the signal communication.

2. The system of claim 1, wherein the power reception apparatus further comprises:
    a load module to which a received second electrical power is supplied; and
    an first power detection module to detect transfer of the first electrical power, and to become active when detecting the transfer of the first electrical power, and
    wherein the second controller is to receive the second electrical power in the allocated period and to supply received power to the load module, and to disconnect the load module in a period other than the allocated period.

3. The system of claim 2,
    wherein the first controller is to transfer the first electrical power and the second electrical power in a continuous burst state, and
    the first power detection module is to detect a start timing of the continuous burst state in order to detect a start timing of the transfer of the first electrical power.

4. The system of claim 3,
    wherein the first controller is to allocate transfer periods of the second electrical power to power reception apparatuses in a time-division manner, to notify the power reception apparatuses of allocated transfer periods by the signal communication, to transfer, in a continuous burst state, the second electrical power in allocated transfer periods and the first electrical power, to reallocate the transfer periods of the second electrical power so that the continuous burst state continues further when one of the power reception apparatuses has finished receiving the second electrical power, and to notify the power reception apparatuses of reallocated transfer periods by the signal communication, and
    wherein the second controller is configured to receive the second electrical power in the allocated transfer periods notified by the signal communication.

5. The system of claim 1, wherein the first controller is to display a list of power reception apparatuses checked by the authentication.

6. The system of claim 1, wherein the second controller is to monitor a power reception level while performing reception of the second electrical power and to adjust a resonant frequency so that the power reception level is maximized by varying a variable capacitor of the second resonator.

7. The system of claim 6, wherein the variable capacitor comprises a piezoelectric resin whose capacitance varies with a voltage change by applying a voltage between terminals.

8. A power transfer apparatus for a wireless power transfer system configured to perform electrical power transfer and signal communication by magnetic field resonance between the power transfer apparatus and a power reception apparatus in a time-division manner, electrical power comprising first electrical power and second electrical power, the power transfer apparatus comprising:
    a resonator to resonate at a resonant frequency and to switch a Q-factor between high and low; and
    a controller to set the Q-factor of the resonator high when performing an electrical power transfer, to set the Q-factor of the resonator low when performing a communication, to transfer the first electrical power at a predetermined interval, to perform authentication based on authentication information comprising identification information of the power reception apparatus from the power reception apparatus, and to transfer the second electrical power to a power reception apparatus which is authenticated and whose allocated period has checked by the signal communication.

9. The power transfer apparatus of claim 8,
    wherein the controller is configured to transfer the first electrical power and the second electrical power in a continuous burst state.

10. The power transfer apparatus of claim 9, wherein the controller is to allocate transfer periods of the second electrical power to power reception apparatuses in a time-division manner, to notify the power reception apparatuses of allocated transfer periods by the signal communication, to transfer, in a continuous burst state, the second electrical power in allocated transfer periods and the first electrical power, to reallocate the transfer periods of the second electrical power so that the continuous burst state continues further when one of the power reception apparatuses has finished receiving the second electrical power, and to notify the power reception apparatuses of reallocated transfer periods by the signal communication.

11. The power transfer apparatus of claim 8, wherein the resonator comprises a variable capacitor to change the resonant frequency, the variable capacitor comprising a piezoelectric resin whose capacitance varies with a voltage change by applying a voltage between terminals.

12. A power reception apparatus for a wireless power transfer system configured to perform electrical power transfer and signal communication by magnetic field resonance between a power transfer apparatus and the power reception apparatus in a time-division manner, electrical power comprising first electrical power and second electrical power, the power reception apparatus comprising:

a resonator to resonate at a resonant frequency and to switch a Q-factor between high and low; and a controller to set the Q-factor of the resonator high when performing an electrical power reception, to set the Q-factor of the resonator low when performing a communication, to receive the first electrical power at a predetermined interval, to perform synchronization with the power transmitting apparatus based on the predetermined interval of the first electrical power, and to receive the second electrical power from a power transfer apparatus which is authenticated by the signal communication and whose allocated period has checked by the signal communication.

13. The power reception apparatus of claim 12, further comprising:

a load module to which the second electrical power is supplied; and an first power detection module to detect the first electrical power being transferred by the first power transfer, and to become active when detecting the first electrical power being transferred, and wherein the controller is to receive the second electrical power in the allocated period of the second electrical power transfer, to supply the second electrical power to the load module, and to disconnect the load module in a period other than the allocated period of the second electrical power transfer.

14. The power reception apparatus of claim 13, wherein the first power detection module is to detect a continuous burst state and to regard the timing of a rising of the continuous burst state as a start timing of the first electrical power transfer.

15. The power reception apparatus of claim 14, wherein the controller is to receive notification from the power transfer apparatus to power reception apparatuses by the communication, the notification indicating an allocated period of the second power transfer, to perform the second electrical power reception in the allocated period.

16. The power reception apparatus of claim 12, wherein the controller is to monitor a power reception level while performing the second electrical power reception and to adjust a resonant frequency so that the power reception level is maximized by varying a variable capacitor of the second resonator.

17. The power reception apparatus of claim 16, wherein the variable capacitor comprises a piezoelectric resin whose capacitance varies with a voltage change by applying a voltage between terminals.

* * * * *